US012509189B2

(12) United States Patent
Mydland

(10) Patent No.: US 12,509,189 B2
(45) Date of Patent: Dec. 30, 2025

(54) APPARATUS, SYSTEM AND METHODS FOR MOVING A LOAD BETWEEN A FLOATING VESSEL AND A SUBMERGED POSITION

(71) Applicant: GRANT PRIDECO, INC., Houston, TX (US)

(72) Inventor: Einar Mydland, Kristiansand (NO)

(73) Assignee: GRANT PRIDECO, INC., Houston, TX (US)

( * ) Notice: Subject to any disclaimer, the term of this patent is extended or adjusted under 35 U.S.C. 154(b) by 406 days.

(21) Appl. No.: 18/273,960

(22) PCT Filed: Feb. 8, 2021

(86) PCT No.: PCT/NO2021/050037
§ 371 (c)(1),
(2) Date: Jul. 24, 2023

(87) PCT Pub. No.: WO2022/169367
PCT Pub. Date: Aug. 11, 2022

(65) Prior Publication Data

US 2024/0409189 A1 Dec. 12, 2024

(51) Int. Cl.
*B63B 27/16* (2006.01)
*B66C 13/02* (2006.01)

(52) U.S. Cl.
CPC .............. *B63B 27/16* (2013.01); *B66C 13/02* (2013.01)

(58) Field of Classification Search
CPC .... B63B 27/16; B63B 2027/165; B66C 13/02
See application file for complete search history.

(56) References Cited

U.S. PATENT DOCUMENTS 3,807,334 A * 4/1974 Egeberg .................. B66C 13/02 114/259
4,078,509 A * 3/1978 Buecher .................... B63C 7/10 114/54
5,190,107 A 3/1993 Langner
5,516,235 A * 5/1996 Stangroom ............... B63C 7/10 405/188

(Continued)

FOREIGN PATENT DOCUMENTS

EP 2896589 A1 * 7/2015 ............. B66C 23/00
PL 237989 B1 * 6/2021

(Continued)

OTHER PUBLICATIONS

PCT/NO2021/050037 International Search Report and Written Opinion dated Nov. 24, 2021 (4 pages).
PCT/NO2021/050037 Written Opinion dated Nov. 24, 2021 (6 pages).

*Primary Examiner* — Magdalena Topolski
(74) *Attorney, Agent, or Firm* — CONLEY ROSE, P.C.

(57) ABSTRACT

The present disclosure describes an apparatus for suspending a connector provided on a first elongated hoisting member during a subsea hoisting operation. The apparatus includes a mechanism for holding the connector, in which, when the mechanism is subjected to a hydrostatic pressure above a threshold pressure, the mechanism is changeable to a configuration for moving past the connector while the apparatus is raised. Also described are a system and methods for moving a load between a floating vessel and a submerged position.

14 Claims, 7 Drawing Sheets

(56) References Cited

U.S. PATENT DOCUMENTS

| | | | | |
|---|---|---|---|---|
| 6,390,012 | B1 * | 5/2002 | Watt | B63B 27/36 114/51 |
| 6,752,100 | B2 * | 6/2004 | Guinn | E21B 19/002 166/355 |
| 7,311,469 | B2 * | 12/2007 | Pollack | B63B 27/16 405/206 |
| 8,764,345 | B2 | 7/2014 | Ardavanis | |
| 8,827,596 | B2 * | 9/2014 | Chiodini | B66D 1/26 405/173 |
| 9,855,999 | B1 * | 1/2018 | Trail | B63B 27/10 |
| 12,365,430 | B2 * | 7/2025 | Jamieson | B63B 27/10 |
| 2011/0286802 | A1 * | 11/2011 | Persson | F16L 1/24 405/224.2 |
| 2013/0333371 | A1 * | 12/2013 | Vigars | E02B 17/08 405/203 |
| 2015/0259043 | A1 * | 9/2015 | Bauer | B63B 21/26 114/230.22 |

FOREIGN PATENT DOCUMENTS

| | | |
|---|---|---|
| WO | 2009005359 | 1/2009 |
| WO | 20100093251 | 8/2010 |

* cited by examiner

APPARATUS, SYSTEM AND METHODS FOR MOVING A LOAD BETWEEN A FLOATING VESSEL AND A SUBMERGED POSITION

CROSS-REFERENCE TO RELATED APPLICATIONS

The present application is a 35 U.S.C. § 371 U.S. National Phase entry of, and claims priority to PCT/NO2021/050037 filed Feb. 8, 2021, and entitled "Apparatus, System and Methods for Moving A Load Between A Floating Vessel and A Submerged Position," which is hereby incorporated herein by reference in its entirety for all purposes.

STATEMENT REGARDING FEDERALLY SPONSORED RESEARCH OR DEVELOPMENT

Not applicable.

BACKGROUND

The present disclosure relates to an apparatus for suspending a connector provided on a first elongated hoisting member during a subsea hoisting operation. The present disclosure also relates to a system for moving a load between a floating vessel and a submerged position. Moreover, the present disclosure relates to a method for lowering a load from a floating vessel to a submerged position and a method for raising a load from a submerged position towards a floating vessel.

Offshore lifting cranes and their related equipment are getting increasingly larger and heavier in order to keep up with the requirements for lifting continually heavier loads, often in increasingly deep waters. Lifting cranes for deep water operations need to store a wire rope with a length in the order of 3000 meters or more. Using a steel wire rope at great depths is undesirable or even impossible as the wire rope itself will become so heavy that it is impractical or even impossible for most commercially available lifting cranes to hoist the wire rope.

For hoisting loads in deep water operations, fibre ropes may be preferred due to their reduced weight compared to traditional steel wire ropes. Most fibre ropes are close to neutrally buoyant in water, thereby not adding significant weight to the lifting operation. However, a challenge related with the use of fibre ropes is the excessive wear, and hence reduced lifetime, when used in repeated bending cycles under load. In particular, the quick deterioration is observed when the hoisting operation is performed with heave compensation, in which the same portion of the fibre rope undergoes numerous bending cycles under load during a period of time that can be prolonged for a few days. The lifetime of a fibre rope can also be difficult to monitor and predict in a reliable manner, leading to excessive safety factors and unnecessary frequent replacements.

The solutions disclosed in WO 2009/005359 A1 and WO 2010/093251 A1 solve the challenge of using a fibre rope to overcome the drawbacks of a heavy steel wire rope. This is achieved by providing hoisting systems where a load being hoisted subsea is carried between two ropes in an alternated manner: a first rope will typically be a steel wire rope with a short length, such as 300 meters; and a second rope will be a fibre rope with sufficient length to reach the seabed from a floating vessel, such as up to 3000 meters or even more. Thus, the steel wire rope will not be extremely heavy, due to its shorter length, and will be the one undergoing bending cycles under load, thereby saving the fibre rope from the deterioration caused by this actuation.

A disadvantage of the known solutions is that the alternation between the two wire ropes requires the use of a remotely operated vehicle (ROV) to activate the disconnection between the two wire ropes, and this makes the alternation (often referred to as "hand-shake") a time-consuming process that adds cost to the hoisting operation.

SUMMARY

Embodiments of systems and methods will now be disclosed and has for their objects to remedy or to reduce at least one of the drawbacks of the prior art, or at least provide a useful alternative to the prior art. The objects are achieved through features, which are specified in the description below and in the claims that follow. The embodiments are defined by the independent patent claims, and the dependent claims.

According to an aspect disclosed herein, there is provided an apparatus for suspending a connector provided on a first elongated hoisting member during a subsea hoisting operation. The apparatus comprises a mechanism for holding the connector, in which, when the mechanism is subjected to a hydrostatic pressure above a threshold pressure, the mechanism is changeable to a configuration for moving past the connector while the apparatus is raised.

It has been realised that the hydrostatic pressure at which the apparatus is subjected to could be used for the purpose of changing the apparatus to a configuration that allows the apparatus to be raised and moved past a connector on the first elongated hoisting member. This is advantageous in that it removes the need to deploy a diver or an ROV in order to change the apparatus to the intended configuration. This is particularly advantageous in deep water operations where the operation of changing the configuration of the apparatus typically happens at depths of at least 300 meters. The known alternative solutions are significantly more time consuming and expensive. Also, since there is no need for ROVs or divers, the solution requires less machinery resources to be provided on the floating vessel from which the load is being suspended. Moreover, this solution requires only one operator for controlling the elongated hoisting members, whereas in the know alternative solutions there is a need for further operators, such as a diver or an ROV operator.

The mechanism may comprise:

- a first chamber for containing a compressible fluid;
- a hydraulic cylinder comprising a second chamber hydraulically connectable to the first chamber and a third chamber for containing a fluid subjected to a hydrostatic pressure, wherein the second chamber and the third chamber are separated by a piston; and
- a first control valve for controlling the hydraulic connection between the first chamber and the second chamber; and
- a contact switch for activating the first control valve when the connector actuates on the contact switch.

In an alternative embodiment, instead of containing the compressible fluid, the first chamber comprises a compression spring or another biasing member against which a hydraulic fluid from the second chamber is operated. The compression spring in the first chamber may be separated from the hydraulic fluid from the second chamber by means of a piston, a membrane, a diaphragm etc. A compressible fluid, a compression spring or any other biasing member will enable the mechanism to change to a configuration for moving past a connector. This is achieved by compressing the compression spring or the compressible fluid once a hydrostatic pressure is exerted above the mentioned threshold pressure.

Also, the apparatus may comprise a one-way valve arranged in parallel to the first control valve, the one-way valve being oriented to permit a free flow only from a hydraulic connection of the first control valve to the first chamber to another hydraulic connection of the first control valve to the second chamber.

Moreover, the apparatus may comprise a second control valve for controlling a hydraulic connection between the first control valve and the second chamber.

Furthermore, the apparatus may comprise a third control valve for controlling a hydraulic connection transmitting a hydrostatic pressure into the third chamber.

In one embodiment, the mechanism may comprise:

- a latch for holding the connector;
- a pivot on which the latch is rotatable; and
- a stopper arranged in relation to the pivot so that the rotation of the latch is stoppable at a position wherein the connector is holdable by the latch.

Also, the hydraulic cylinder may be arranged so that the latch is actuatable by a piston rod connected to the piston of the hydraulic cylinder, the actuation by the piston rod causing the latch to rotate to a position for moving the mechanism past the connector while the apparatus is raised.

Moreover, the mechanism may comprise an elastic body for tensioning the rotation of the latch towards the stopper.

Furthermore, the latch may comprise a density configured to position the centre of mass of the latch in relation to the pivot so that the latch automatically rotates towards the stopper.

In another embodiment, the apparatus may comprise a channel for passing the connector through the apparatus, wherein the mechanism is arranged in relation to the channel so that the connector is holdable within the channel.

Also, the contact switch may be arranged for protruding into the channel.

According to another aspect, there is provided a system for moving a load between a floating vessel and a submerged position. The system comprises:

- an apparatus embodiment according to the present disclosure;
- a first elongated hoisting member for suspending the load, the first elongated hoisting member comprising at least one connector for being held by the apparatus; and
- a second elongated hoisting member for suspending the apparatus.

According to a further aspect, there is provided a method for lowering a load from a floating vessel to a submerged position. The method comprises the steps of:

- providing a system embodiment according to the present disclosure;
- in a first mode of suspension, suspending the apparatus from the floating vessel using a length of the second elongated hoisting member and the load from the apparatus using a portion of a length of the first elongated hoisting member while the mechanism holds a connector provided on the first elongated hoisting member;
- while maintaining the first mode of suspension, increasing both the length of the first elongated hoisting member and the length of the second elongated hoisting member from the floating vessel until the mechanism of the apparatus is subjected to a hydrostatic pressure above a threshold pressure;
- in a second mode of suspension, suspending the load from the floating vessel using the length of the first elongated hoisting member;
- while maintaining the second mode of suspension, changing the mechanism to a configuration for moving past the connector while the apparatus is raised.

According to a yet another aspect, there is provided a method for raising a load from a submerged position towards a floating vessel. The method comprises the steps of:

- providing a system embodiment according to the present disclosure;
- in a second mode of suspension, suspending the load from the floating vessel using a length of the first elongated hoisting member;
- while maintaining the second mode of suspension, increasing a length of the second elongated hoisting member until the mechanism of the apparatus moves past a connector provided on the first elongated hoisting member;
- in a first mode of suspension, suspending the apparatus from the floating vessel using a length of the second elongated hoisting member and the load from the apparatus using a portion of the length of the first elongated hoisting member while the mechanism holds the connector;
- while maintaining the first mode of suspension, decreasing both the length of the first elongated hoisting member and the length of the second elongated hoisting member from the floating vessel.

BRIEF DESCRIPTION OF THE DRAWINGS

Embodiments in accordance with principles described herein will now be described, by way of example only, with reference to the accompanying drawings, in which.

DETAILED DESCRIPTION

In the present description, the terms “lower”, “upper”, “bottom” and “top” may be used for referring to parts and portions of a component as seen when the component is in a preferred orientation of use at a submerged position. Similarly, the terms “below”, “above”, “vertical” and “horizontal” may be used for describing a relative positioning as seen from an elevation view of a submerged position between a seabed 20 at the bottom of the view and a surface of seawater at the top of the view.

Figure 1A:
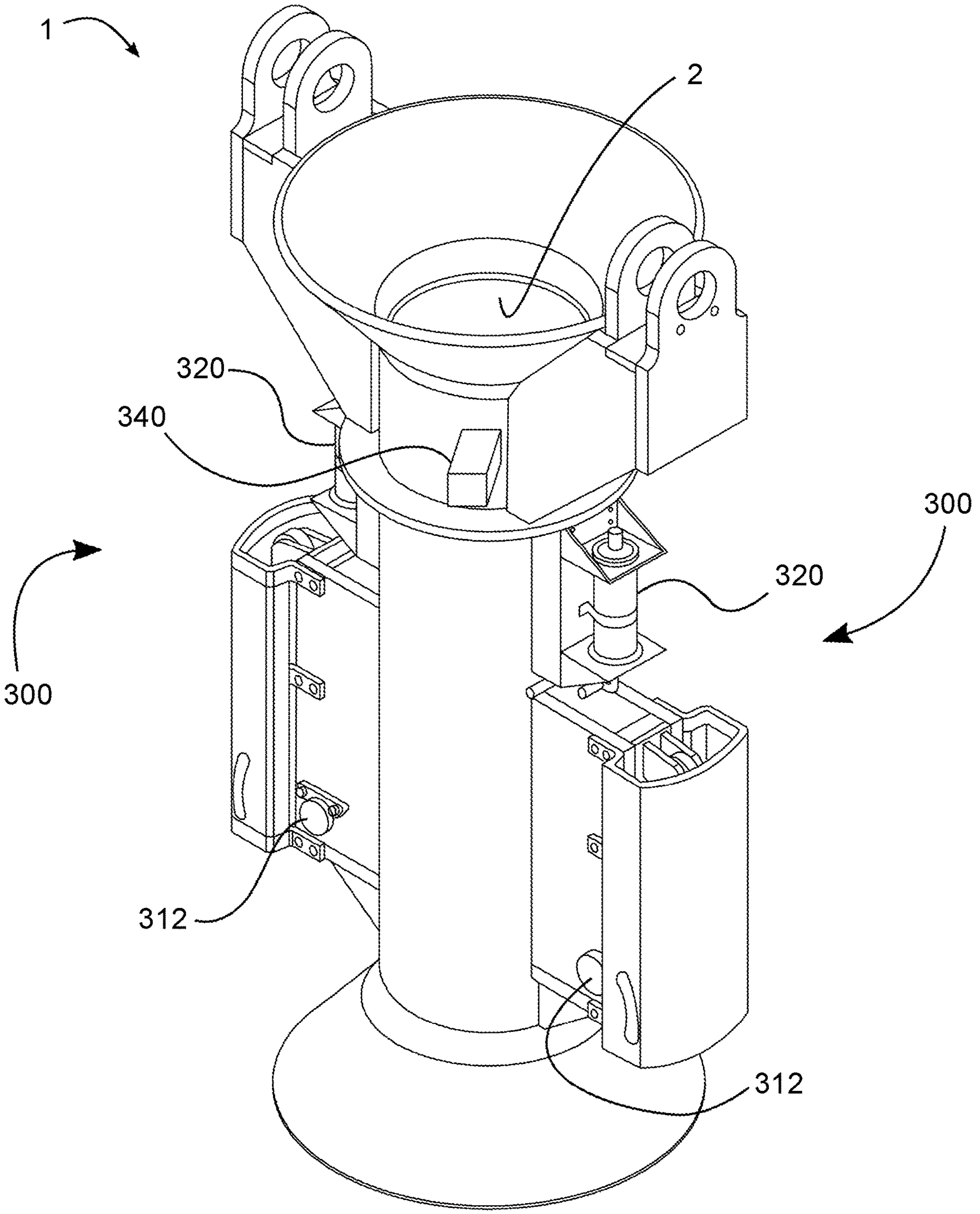
FIG. 1A is a perspective view of an apparatus embodiment.
Figure 1B:
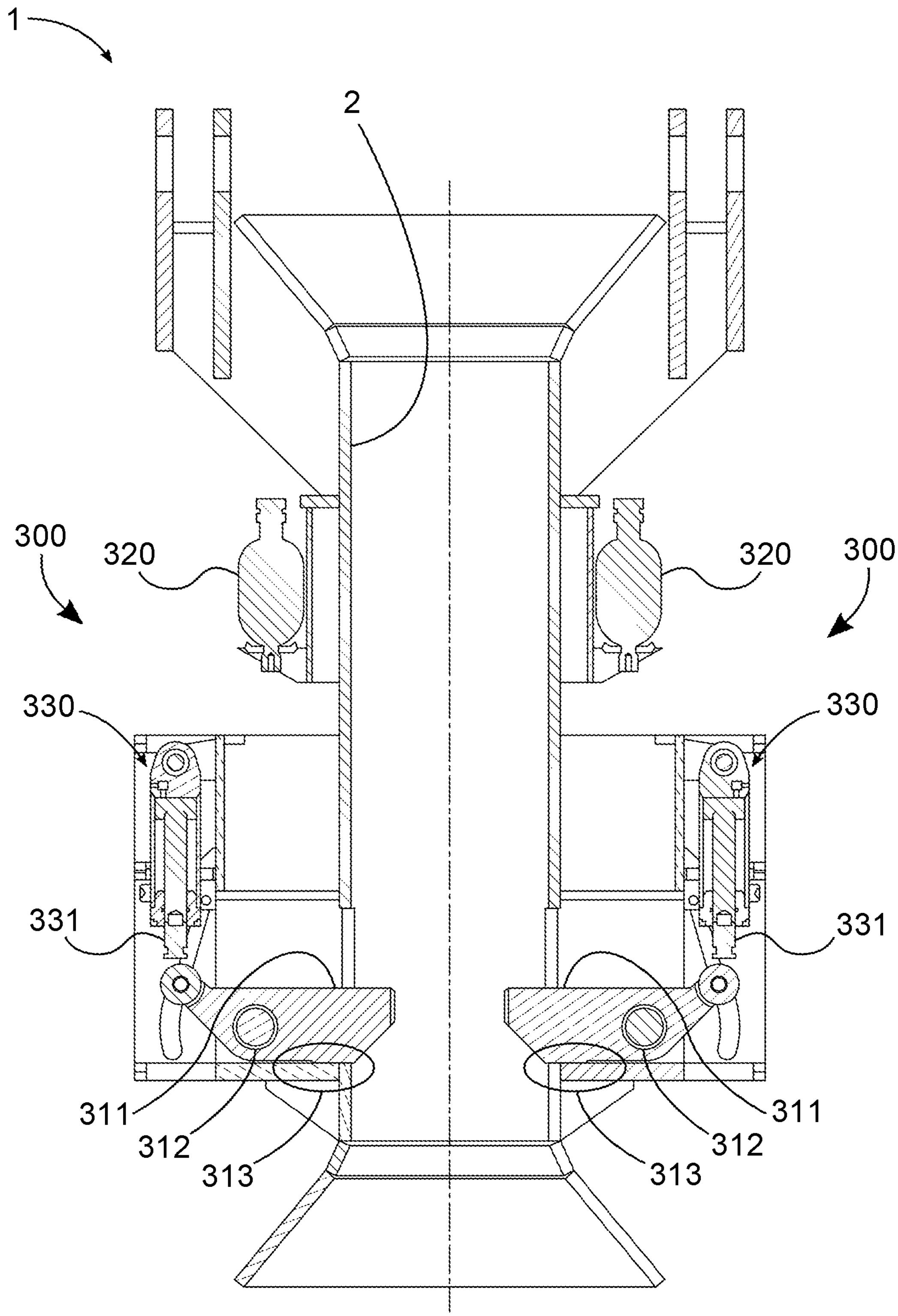
FIG. 1B is a cross sectional view of the apparatus embodiment shown in FIG. 1A.

FIGS. 1A and 1B show an apparatus embodiment 1 according to the present disclosure, the apparatus 1 being shown from a perspective view and from a cross-sectional view, respectively. The orientation of the apparatus 1 in relation to the page is in alignment with the preferred orientation of use, in which the top portion of the apparatus 1 is the closest portion to the surface of the seawater and the bottom portion of the apparatus 1 is the closest portion to the seabed 20. Also, some details of the apparatus 1 have been simplified or omitted from the figures for illustrative purposes.

Figure 4A:
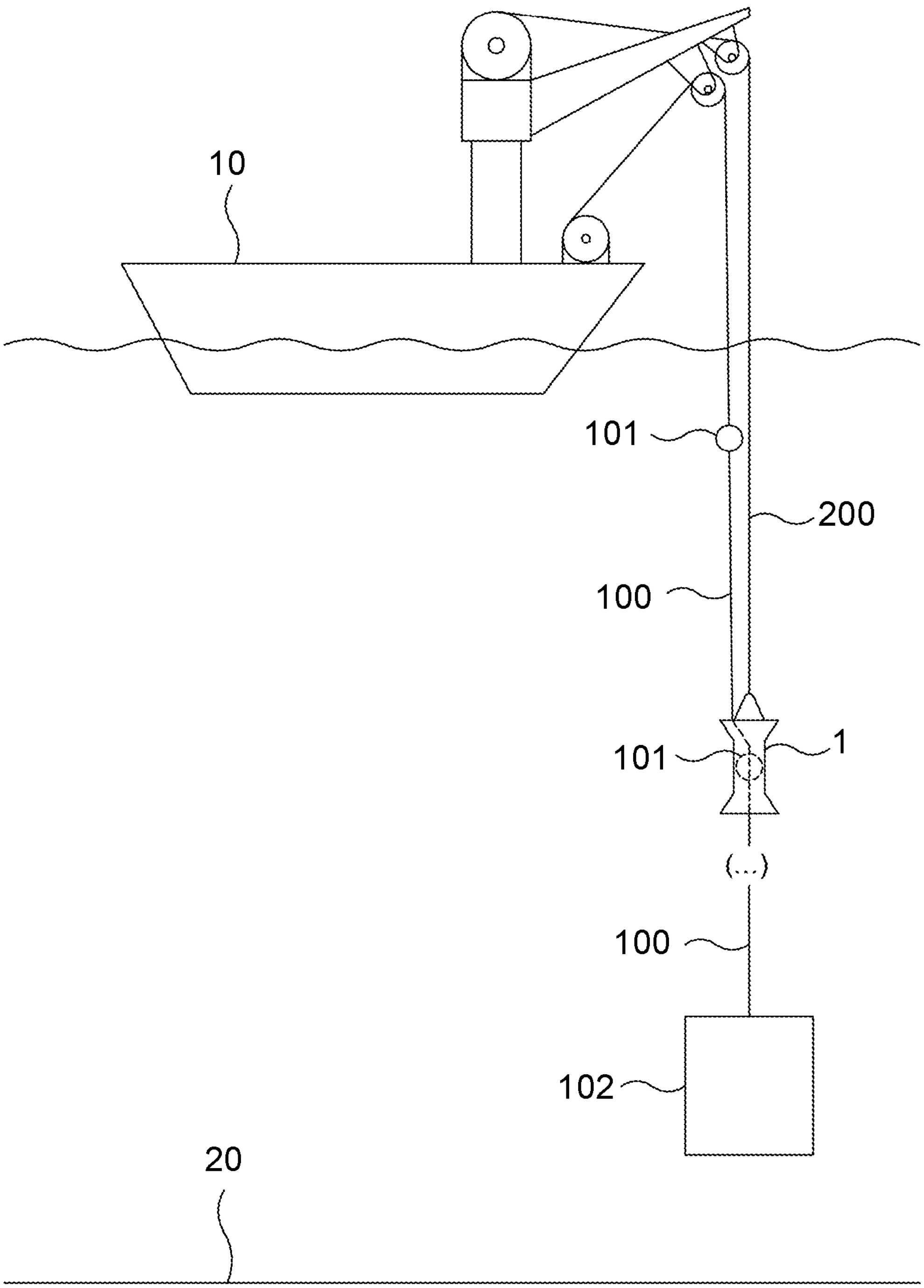
FIGS. 4A-4B are schematic elevation views of a situation in which a subsea hoisting operation is being carried out using a system embodiment operating in two modes of suspension.
Figure 4B:
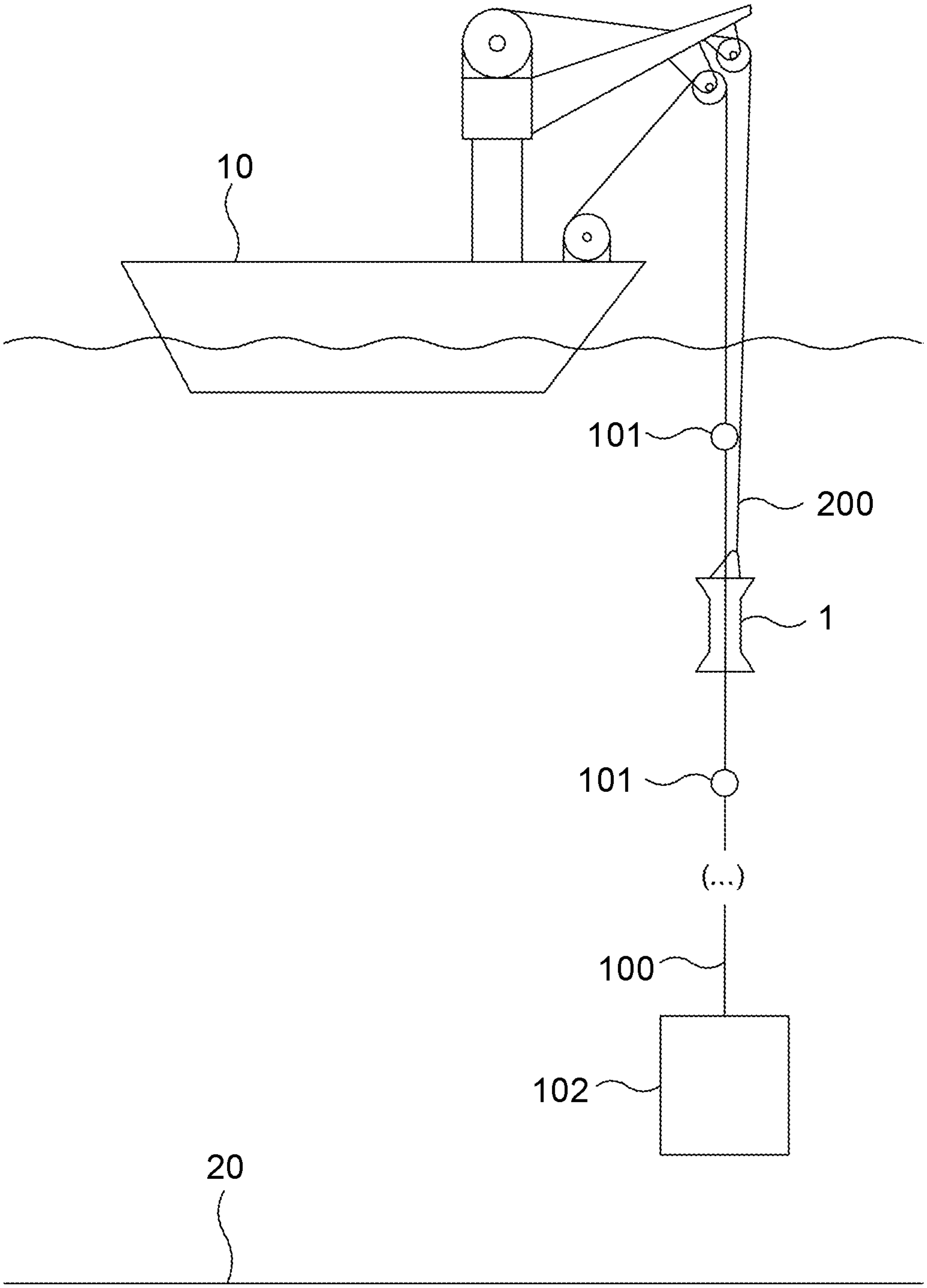

The apparatus 1 in FIGS. 1A and 1B includes a channel 2 suitable for enclosing a portion of a first elongated hoisting member 100 while the latter is being used for suspending a load 102 from a floating vessel 10 (FIGS. 4A, and 4B). The channel 2 has a tubular shape and it crosses the apparatus 1 along a vertical axis (shown in FIG. 1B as a vertical dashed line). Arranging the first elongated hoisting member 100 through the channel 2 results in the apparatus 1 becoming restricted to only be able to move along the first elongated hoisting member 100.

The apparatus embodiment 1 shown in FIGS. 1A and 1B also includes four parts at the top that are suitable for connecting a second elongated hoisting member 200 (FIGS. 4A and 4B) to suspend the apparatus 1 from a floating vessel 10. Each of the four parts projects upwards and includes a transversal circular hole for fastening the connection with the second elongated hoisting member 200. The skilled person will be able to develop many alternative solutions for connecting the second elongated hoisting member 200 to the apparatus 1.

Thus, the apparatus 1 may be used in a subsea hoisting operation in which a first elongated hoisting member 100, such as a fibre rope 100, is used for suspending the load 102 and a second elongated hoisting member 200, such as a steel wire rope 200, is used for suspending the apparatus 1. With the first elongated hoisting member 100 arranged through the channel 2, the apparatus 1 can be raised or lowered to a position along the first elongated hoisting member 100 by making the second elongated hoisting member 200 shorter or longer.

The apparatus 1 includes a mechanism 300 for holding a connector 101 provided on the first elongated hoisting member 100. The mechanism 300 is more easily observed in FIG. 1B, as most of the components of the mechanism 300 are not visible in the perspective view shown in FIG. 1A.

The mechanism 300 includes two latches 311 for holding a connector 101 within the channel 2. The latches 311 are rotatable around pivots 312 and the latches' rotations intersect with the interior of the channel 2 so that a connector 101 may be held within the channel 2. The mechanism 300 also includes a stopper 313 for each latch 311, each stopper 313 being arranged in relation to the respective latch pivot 312 so that the rotation of the respective latch 311 is stoppable at a position in which the connector 101 is holdable by the latch 311. In FIG. 1B, the stop positions of the latches 311 can be observed as being horizontal in relation to the orientation of the page and pointing towards the interior of the channel 2.

In the embodiment shown in FIGS. 1A and 1B, the latches 311 are positioned opposite to each other around the central axis of the channel 2. Other apparatus embodiments 1 may include a different number of latches 311. For example, the skilled person may develop an apparatus embodiment 1 with a single latch 311 that is suitable for holding a connector 101 within the channel 2 without requiring any other latch 311. Other apparatus 1 embodiments may include three or more latches 311 positioned around the central axis of the channel 2.

When the apparatus 1 is raised or lowered by the second elongated hoisting member 200, the first elongated hoisting member 100 and any connector 101 fixed to it will be passed through the channel 2. It can be observed that, when a connector 101 is passed through the channel 2 from the bottom to the top of the apparatus 1, the latches 311 will be pushed by the connector 101 to rotate upward and away from the central axis of the channel 2. On the other hand, when the connector 101 is passed through the channel 2 from the top to the bottom of the apparatus 1, the latches 311 will be pushed by the connector 101 towards the stoppers 313. The stoppers 313 will block the latches 311 from rotating further and this will cause the connector 101 to be obstructed from continuing passing downward through the channel 2. This mechanical obstruction results in the connector 101 being held by the apparatus 1.

The mechanism 300 also includes hydraulic cylinders 330 for controllably rotating the latches 311 and allow any connector 101 to be passed through the channel 2 in a downward movement in relation to the apparatus 1 without getting caught by the latches 311. The hydraulic cylinders 330 are arranged so that a piston rod 331 of the hydraulic cylinders 330 actuates on a portion of the respective latch 311 and causes the latter to rotate. In FIG. 1B, it can be observed that the actuation of the hydraulic cylinders 330 will cause the latches 311 to rotate upwards in relation to the orientation of the page and away from the central axis of the channel 2 (shown as a vertical dashed line in FIG. 1B). This creates the necessary clearance within the channel 2 for a connector 101 provided on the fibre rope 100 to be able to be passed through the channel 2 in a downward movement in relation to the apparatus 1 without being held by the mechanism 300.

The hydrostatic pressure to which the mechanism 300 is subjected is used for controllably powering the actuation of the piston rod 331. The hydrostatic pressure is defined by the formula:

$$p=\rho g h$$

in which ρ is the density of the fluid (the density of water is 1000 kg/m3), g is the acceleration of gravity (9.81 m/s$^2$) and h is the height of the column of fluid. It can be observed from this formula that the hydrostatic pressure is directly proportional to the depth of the submerged position at which the hydrostatic pressure is being calculated. The following table shows some example heights and corresponding pressure values:

| h, Height of fluid column (m) | p, Pressure (kPa) | p, Pressure (Bar = 105 Pa) |
|---|---|---|
| 1 | 9.81 | 0.10 |
| 5 | 49.03 | 0.49 |
| 10 | 98.07 | 0.98 |
| 50 | 490.33 | 4.90 |
| 100 | 980.67 | 9.81 |
| 300 | 2942.00 | 29.42 |

In order to control the actuation of the piston rods 331 on the latches 311, the mechanism 300 includes two instances of a first chamber 320 for containing a compressible fluid and one instance of a valve module 340 (visible in FIG. 1A) for controlling hydraulic connections between each of the hydraulic cylinders 330 and the respective first chamber 320. These three components are used for controllably subjecting the compressible fluid in the first chamber 320 to the hydrostatic pressure. When the valve module 340 allows the hydrostatic pressure accumulated in the hydraulic cylinder to be released into the first chamber 320, the piston rod 331 will move and actuate on the respective latch 311.

Using the hydrostatic pressure to controllably power the actuation of the piston rods 331 makes it simpler to move the latches 311 at submerged positions. This is also advantageous in that it avoids the added challenges and costs to deploy a human diver or a remotely operated vehicle (ROV) for the purpose of rotating the latches 311.

The two first chambers 320 are visible in FIGS. 1A and 1B at positions of the apparatus 1 above the latches 311, and the valve module 340 is visible in FIG. 1A above and at an angle of both first chambers 320. The skilled person will see that different numbers of valve modules 340 and first chambers 320 may be used for controlling the hydraulic connections between hydraulic cylinders 330 and first chambers 320. For example, one valve module 340 may be provided for each first chamber 320. Alternatively, one first chamber 320 may be provided for both hydraulic cylinders 330.

FIGS. 1A and 1B do not show any tubing for establishing hydraulic connections, such as hydraulic connections related to the hydraulic cylinders 330, the first chambers 320 and the valve module 340. However, the skilled person will see that any omitted tubing connections may be installed without requiring inventive skills. Also, the valve module 340 is shown in the perspective view illustrated in FIG. 1A but not in the cross-sectional view illustrated in FIG. 1B. This omission relates to a misalignment of the valve module 340 in relation to the cross-section shown in FIG. 1B. Other apparatus embodiments 1 may have a valve module 340 positioned differently.

Figure 2:
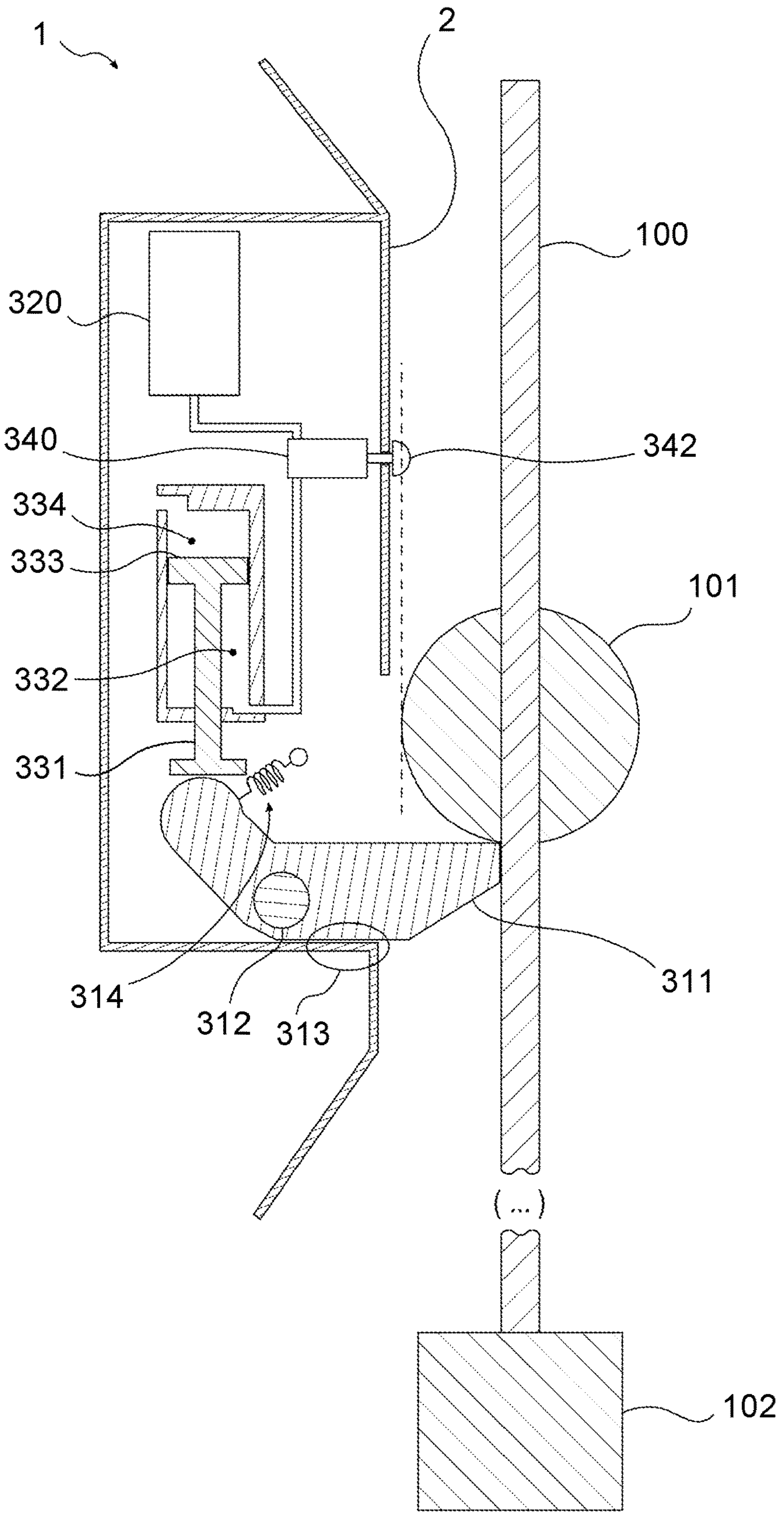
FIG. 2 is a schematic cross-sectional view of a portion of another apparatus embodiment while holding a connector.

FIG. 2 shows a schematic cross-sectional view of another apparatus embodiment 1 while holding a connector 101 provided on a first elongated hoisting member 100. The apparatus embodiment 1 shown in FIG. 2 is similar to the embodiment shown in FIGS. 1A and 1B. Several parts and components of the apparatus 1 have been omitted or simplified for illustrative purposes. For example, only one side of the cross-sectional view of the apparatus 1 is shown, this side being on the left-hand side of the first elongated hoisting member 100 as viewed in FIG. 2.

One difference of the apparatus 1 when compared to the apparatus embodiment 1 shown in FIGS. 1A and 1B is that the mechanism 300 includes an elastic body 314, such as a spring, for biasing the rotation of the latch 311 towards the stopper 313. This is advantageous for keeping the latch 311 in contact with the stopper 313 when there is no connector 101 being held by the apparatus 1. Also, the use of the apparatus 1 will, by default, be provided with a configuration for holding a connector 101, and this is advantageous in that it increases the safety of using the apparatus 1 and eliminating the possibility of inadvertently letting the connector 101 fall.

In another mechanism embodiment 300, the latch 311 may, instead or in addition to the elastic body 314, be replaced by a latch 311 with the same shape but having a density configured to position the centre of mass of the latch 311 in relation to the pivot 312 so that the latch 311 automatically rotates towards the stopper 313. This can be achieved by providing the portion of the latch 311 that intersects the channel 2 with a higher weight than the rest of the latch 311. Causing the automatic rotation by means of a density configuration of the latch 311 is advantageous in that it does not require other components, such as the elastic body 314, to be exposed to the seawater and thus reduces the need for maintenance. Providing both the elastic body 314 and the density configuration for the latch 311 is advantageous in that the automatic rotation behavior is stronger and more resilient should the elastic body 314 fail.

The controllable actuation of the piston rod 331 on the latch 311 will now be further described with reference to the components and hydraulic connections schematically shown in FIG. 2.

In addition to the first chamber 320, the mechanism 300 includes two chambers within the hydraulic cylinder 330: a second chamber 332 (shown in the bottom portion of the hydraulic cylinder 330 in FIG. 2) for exchanging a hydraulic fluid with the first chamber 320; and a third chamber 334 (shown in the upper portion of the hydraulic cylinder 330 in FIG. 2) for containing a fluid subjected to the hydrostatic pressure to which the mechanism 300 is subjected. The two chambers of the hydraulic cylinder 330 are separated by a piston 333, which is connected to the piston rod 331 that is used for actuating on the latch 311.

It can be observed that the interior of the third chamber 334, shown in the upper portion of the hydraulic cylinder 330 in FIG. 2, is subjected to the hydrostatic pressure on the exterior of the hydraulic cylinder 330. This is schematically illustrated by the opening at the top left corner of the hydraulic cylinder 330. Further openings may be available in the apparatus 1 in locations not shown in the cross-sectional view in FIG. 2 that result in the interior of the third chamber 334 being subjected to the hydrostatic pressure to which the apparatus 300 is subjected. In a preferred implementation, a device may be additionally provided and hydraulically connected to the third chamber 334 for blocking any sea water from entering the third chamber 334 while enabling the transmission of the hydrostatic pressure. This reduces the need for maintenance of the hydraulic cylinder 330. The device may, for example, include a membrane or a fluid that is immiscible with sea water for creating a movable barrier between the sea water and a hydraulic fluid being used within the third chamber 334. The skilled person will not require inventive skill to develop alternative solutions for both transmitting the hydrostatic pressure to the interior of the third chamber 334 and blocking the sea water from entering the third chamber 334.

Also, it can be observed that the first chamber 320, the second chamber 332 and the valve module 340 form a closed hydraulic circuit. In this circuit, the first chamber 320 and the second chamber 332 are hydraulically connected to each other and the valve module 340 is used for controlling this hydraulic connection between the first chamber 320 and the second chamber 332. The valve module 340 is shown intersecting the hydraulic connection between the first chamber 320 and the second chamber 332.

The valve module 340 includes a contact switch 342 protruding into the channel 2. The contact switch 342 is used for opening a first valve 341, provided within the valve module 340, controlling the hydraulic connection between the first chamber 320 and the second chamber 332. The protrusion formed by the contact switch 342 allows a connector 101 being passed through the channel 2 to contact and transversely push the contact switch 342, thus activating the hydraulic connection between the first chamber 320 and the second chamber 332. In a preferred implementation, the protrusion of the contact switch 342 is a semi-spherical shape. The height of the contact switch 342 as measured from the channel's 2 inner surface is suitable for intersecting the connector's 101 path through the channel 2 while allowing the connector 101 to move past the contact switch 342 when the contact switch is being pressed. A skilled person will find alternative shapes for the protrusion of the contact switch 342 within the interior of the channel 2. The valve module 340 will be further described below, with reference to FIGS. 3A to 3C.

Moreover, the first chamber 320 may include a barrier for blocking the hydraulic fluid, such as a liquid, from being mixed with the compressible fluid, such as a gas, while enabling the exchange of pressure between the two fluids. This advantageously reduces the need for maintenance of the first chamber 320. Such a barrier may, for example, include a membrane, or the compressible fluid may be immiscible with the hydraulic fluid.

Thus, the closed hydraulic circuit formed by the first chamber 320, the second chamber 332 and the valve module 340 makes it possible to transmit pressure in a controlled manner between the piston 333 within the hydraulic cylinder 330 and the compressible fluid within the first chamber 320.

In a situation in which the apparatus 1 is being lowered in seawater, the hydrostatic pressure transmitted to the interior of the third chamber 334 will, according to the formula of the hydrostatic pressure, increase proportionally to the depth at which the apparatus 1 is positioned. The increased hydrostatic pressure transmitted to the interior of the third chamber 334 will increase the pressure applied on the piston 333, which in turn will increase the pressure of the hydraulic fluid between the second chamber 332 and the valve module 340.

In this situation, the piston rod 311 will not actuate on the latch 311 if the hydraulic connection between the second chamber 332 and the first chamber 320 is closed by the valve module 340. This is caused due to the piston 33 being obstructed by the hydraulic fluid contained between the second chamber 332 and the valve module 340 and due to the hydraulic fluid typically being incompressible or approximately incompressible. Thus, when the contact switch 343 of the valve module is not being pressed by the connector 101, the hydraulic connection between the two chambers remains closed and the piston rod 331 will not actuate on the latch 311.

The contact switch 342 can be pressed by lowering the apparatus 1 in relation to the first elongated hoisting member 100 so that the connector 101 is passed against the contact switch 342. When the contact switch 342 is pressed, the valve module 340 will open the hydraulic connection between the second chamber 332 and the first chamber 320, and the piston 333 will react towards balancing the pressure applied on the piston 33 by the third chamber 334 and by the second chamber 320. The piston 333 will move downwards (in accordance with the orientation of FIG. 2) when the hydrostatic pressure applied on the side of the piston 333 facing the third chamber 334 is higher than the pressure applied on the other side of the piston 333 by the hydraulic fluid and the compressible fluid within the first chamber 320. In that case, the hydraulic fluid from the second chamber 332 is pushed by the piston 333 and flows towards the first chamber 320 to pressurise the compressible fluid therein. The hydraulic fluid displacement and downward movement of the piston 333 will cause the piston rod 331 to actuate on the latch 331.

Thus, by using the hydrostatic pressure, the mechanism 300 is capable of being changed to a configuration in which the latch 311 is rotated away from the centre of the channel 2, and the connector 101 can be passed through the channel 2 from the top to the bottom of the apparatus 1 without contacting the latch 311. The apparatus 1 can therefore move past the connector 101 while the apparatus 1 is raised.

Moreover, by configuring the initial pressure of the compressible fluid stored within the first chamber 320, it is possible to establish a threshold pressure below which the hydrostatic pressure will not be capable of making the piston rod 331 actuate on the latch 311. This behaviour is caused by the difference of pressures observed by the piston 333 not being favourable to move the piston downwards in accordance with the orientation shown in FIG. 2. As long as the hydrostatic pressure is not higher than the pressure of the compressible fluid, the piston rod 331 will not actuate on the latch 311.

In other words, configuring the initial pressure of the compressible fluid allows defining a threshold depth until which pressing the contact switch 342 will not cause the piston rod 331 to actuate on the latch 311. For example, if the initial pressure of the compressible fluid in the first chamber 320 is set to 29.42 bar, the contact switch 342 will only cause the piston rod 331 to actuate on the latch 311 after the apparatus 1 has been lowered to more than the threshold depth of 300 meters because this is the depth at which the hydrostatic pressure is expected to be 29.42 bar. Configuring the initial pressure of the compressible fluid can be advantageous in increasing the safety of using the apparatus 1 because the contact switch 342 can be inadvertently pressed by a connector 101 before the apparatus 1 reaches an intended depth and this will not cause the latch 311 to be actuated by the piston rod 331.

Figure 3A:
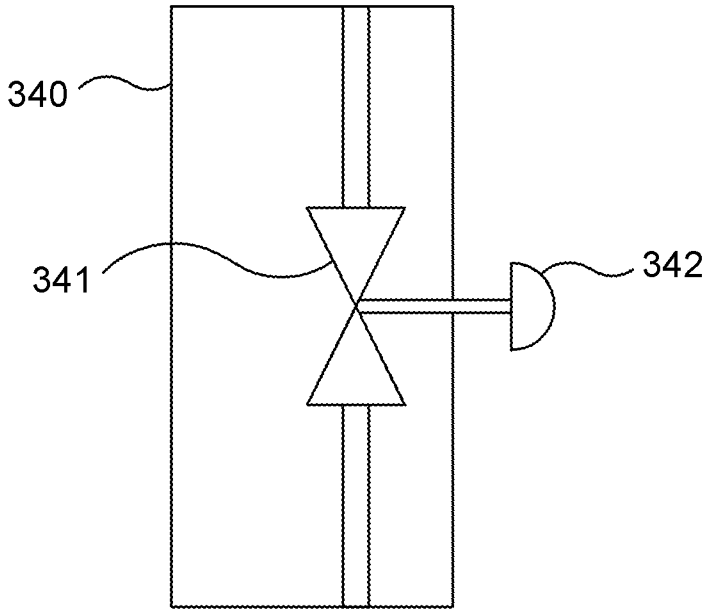
FIGS. 3A-3C are schematic views of valve module embodiments for controlling the hydraulic connection between the first and second chambers.
Figure 3B:
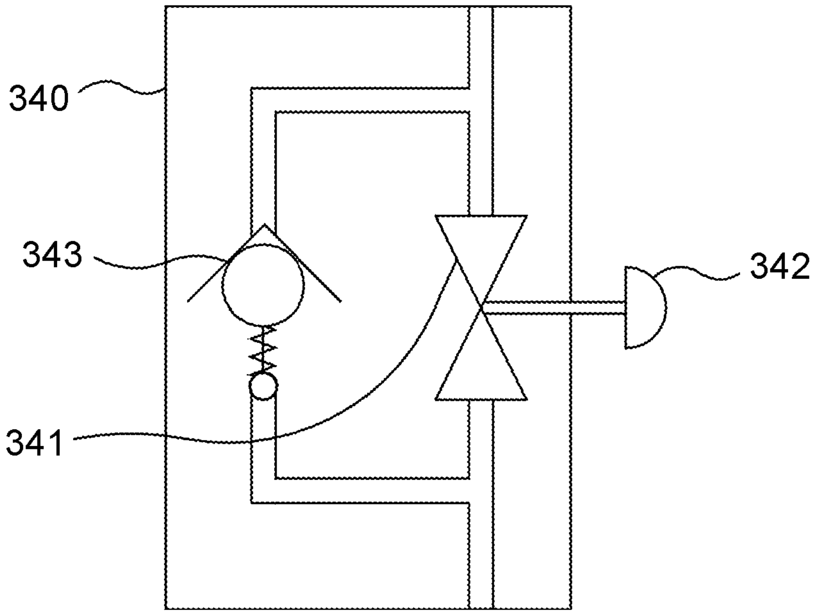
Figure 3C:
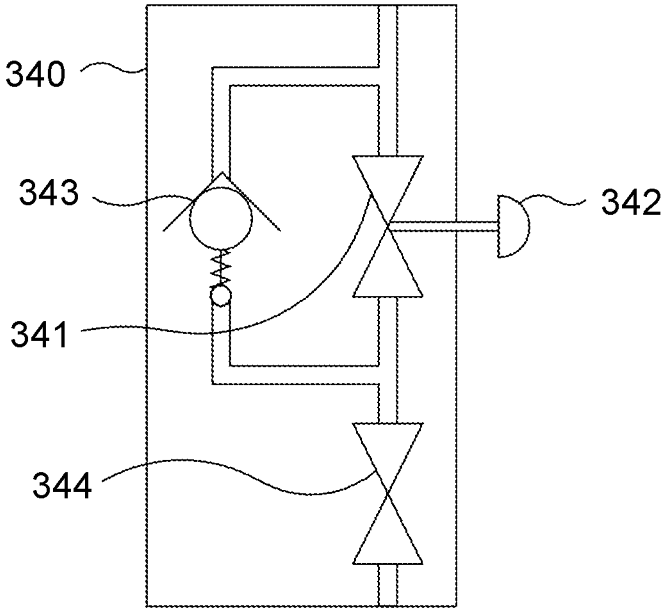

FIGS. 3A-3C show schematic views of valve module embodiments 340 that could be used as the valve modules 340 shown in FIGS. 1A and 2.

FIG. 3A shows a valve module 340 including a first control valve 341 for controlling the hydraulic connection between the first chamber 320 and the second chamber 332. The first control valve 341 includes two hydraulic terminals. A top terminal is illustrated as being hydraulically connected to the top of the valve module 340 shown in FIG. 3A, and this terminal connects to the first chamber 320. A bottom terminal is illustrated as being hydraulically connected to the bottom of the valve module 340 shown in FIG. 3A, and this terminal connects to the second chamber 332. Also, the first control valve 341 can be activated by the contact switch 342.

In a preferred embodiment, the first control valve 341 is closed unless the contact switch 342 is being pressed.

FIG. 3B shows a valve module embodiment 340 that has similarities with the embodiment shown in FIG. 3A.

A difference of the valve module 340 shown in FIG. 3B is that a one-way valve 343 is included and arranged in parallel to the first control valve 341. The one-way valve 343 is oriented to permit a free flow only from the top terminal, i.e. the hydraulic connection of the first control valve 341 to the first chamber 320, to the bottom terminal, i.e. the hydraulic connection of the first control valve 341 to the second chamber 332.

This valve module embodiment 340 is advantageous in that it enables the compressible fluid within the first chamber 320 to depressurize whenever the pressure within the second chamber 332 is lower than the pressure within the first chamber 320. This automatic depressurization is achieved without requiring the activation of the contact switch 342. Thus, when the apparatus 1 is raised and the hydrostatic pressure transmitted into the third chamber 334 decreases, the one-way valve 343 will enable the transmission of any excess pressure from the top terminal to the bottom terminal of the first control valve 341 and thus keep the pressure of the compressible fluid within the first chamber 320 to be at most the pressure of the hydraulic fluid between the second chamber 332 and the first control valve 341.

FIG. 3C shows a valve module embodiment 340 that has similarities with the embodiment shown in FIG. 3B.

One difference of the valve module 340 shown in FIG. 3C is that a second control valve 344 is included for controlling the hydraulic connection between the first control valve 341 and the second chamber 334. The second control valve 344 can be used for closing the hydraulic connection between the second chamber 332 and the first chamber 320 independently of the hydrostatic pressure or the activation of the contact switch 342. In a preferred embodiment, the second control valve 344 is open by default and closed only when it has been configured to be closed.

For example, it can be useful in some hoisting operations to close the second control valve 344 before submerging the apparatus 1. Then, the apparatus 1 can be controlled to perform the following movements: lowering the apparatus 1 to move past a connector 101 at a lower depth on a first elongated hoisting member 100; once the apparatus 1 has moved past the connector 101, raising the apparatus 1 so that the passed connector 101 is held and raised by the apparatus 1; repeating these steps until the first elongated hoisting member 100 has been decreased as intended. In this hoisting operation, closing the second control valve 344 is advantageous in that a higher safety is provided due to the inability of the connector 101 to inadvertently press the contact switch 342 and cause the connector 101 to be abruptly dropped.

In one apparatus embodiment 1 not shown in the Figures, the apparatus 1 includes a third control valve 335 for controlling a hydraulic connection transmitting the hydrostatic pressure into the third chamber 334. Closing this valve blocks the interior of the third chamber 334 from being subjected to the hydrostatic pressure applied on the apparatus 1. Thus, the third control valve 335 can be advantageous in increasing the safety of the apparatus 1 similarly to the second control valve 344 described above with reference to FIG. 3C.

Turning now to FIGS. 4A and 4B, these show a situation in which a subsea hoisting operation is being carried out. A load 102 is being moved by a system embodiment based on a floating vessel 10. For illustrative purposes, the floating vessel 10 is shown as a trapezoid and the load 102 is shown as a square. Moreover, it can be observed that the system components and proportions in FIGS. 4A and 4B are shown in a simplified manner. For example, the distance between the floating vessel 10 and the seabed 20 in a deep-water operation may be in the order of thousands of metres.

The system shown in FIGS. 4A and 4B deals with the challenges of handling a heavy steel wire rope using an arrangement of ropes similar to the ones described in WO 2009/005359 A1 and WO 2010/093251 A1. The system includes two elongated hoisting members: a fibre rope 100 for suspending the load 102; and a steel wire rope 200 for suspending an apparatus 1 embodiment according to the present disclosure. The two elongated hoisting members, i.e. the fibre rope 100 and the steel wire rope 200, can be independently made longer or shorter from the floating vessel 10. This capability is illustrated by the two winches shown on the floating vessel 10, one shown at the top of a crane mast on the floating vessel 10 and the other winch being on the main deck of the floating vessel 10.

Also, the apparatus 1 and the fibre rope 100 have been arranged so that the fibre rope 100 runs through a channel 2 crossing the apparatus 1. This restricts the movements of the apparatus 1 so that it may be moved up or down along the fibre rope 100. Thus, by making the steel wire rope 200 longer or shorter, the system can move the apparatus 1 to a position along the fiber rope 100. The range of positions that can be reached by the apparatus 1 depends on the length of the steel wire rope 200.

In addition to being movable along the fibre rope 100, the apparatus 1 can hold a component provided at a fixed position on the fibre rope 100. In this respect, the fibre rope 100 includes two connectors 101 at fixed positions: a lower connector 101 can be observed within the apparatus 1 in FIG. 4A as a dashed circle; and an upper connector can be observed as a circle with a solid line fixed to the fibre rope 100 at an upper position closer to the floating vessel 10. The same two connectors are observed in FIG. 4B but the lower connector 101 is no longer shown within the apparatus 1.

The connectors 101 can be implemented as a solid objects or devices provided at a fixed position on the fibre rope 100. In the FIGS. 2, 4A and 4B, the connector 101 is schematically shown as a sphere encircling a position on the fibre rope 100. The skilled person will be able to use a connector 101 based on other shapes and kinds of fixture without requiring inventive skill. In an alternative embodiment, the connectors 101 may be of the type disclosed in EP 3670961 A1, in which the connectors, rather than encircling a fibre rope 100, are used to splice ends of fibre rope segments together. The connector may be barrel shaped with a slightly enlarged diameter over its midportion.

The apparatus 1 can hold a connector 101 when the apparatus 1 is raised along the fibre rope 101 and the connector 101 enters the channel of the apparatus 1. By using the apparatus 1 to hold the connector 101, the system can suspend the connector 101 using the steel wire rope 200. Moreover, since the connector 101 is fixed on the fibre rope 100, the system can suspend the portion of the fiber rope 100 between the load 102 and the connector 101 using the mechanical connection established between the apparatus 1 and the connector 101. Thus, it becomes possible to operate the system shown in FIGS. 4A and 4B in two modes of suspension.

In a first mode of suspension, shown in FIG. 4A, the weight of the load 102 is transmitted to the floating vessel 10 by two rope segments: a rope segment between the load 102 and the apparatus 1, this segment being provided by a portion of the fibre rope 100; and another rope segment between the floating vessel 10 and the apparatus 1, this segment being provided by the steel wire rope 200. This mode of suspension requires the apparatus 1 to hold a connector 101, which is shown as a dashed circle within the apparatus 1 in FIG. 4A. Thus, a chain of mechanical connections is established: the weight of the load 102 tensions the fibre rope 100 segment between the load 102 and the apparatus 1; then, within the apparatus 1, the connector 101 is both pulled down by the fibre rope 100, due to the tension from the load 102, and held by the apparatus 1; and the apparatus 1 tensions the steel wire rope 200 extended from the floating vessel 10.

It can be observed that, in this first mode of suspension, the weight of the load 102 is transmitted from the apparatus 1 to the floating vessel 10 only through the steel wire rope 200 and this has the advantage of limiting the execution of bending cycles under load only to the steel wire rope 200 and keeping the fibre rope 100 free from deterioration due to this type of bending cycle. Moreover, it can be observed that the fibre rope 100 segment between the load 102 and the apparatus 1 is subjected to the weight of the load 102 but not subjected to bending cycles. Thus, the first mode of suspension is advantageous for moving the load 102 between two submerged positions.

Ensuring that the connector 101 is in contact with and being held by the apparatus 1 when the load 102 is being lowered is achieved by accompanying the changes of length of the steel wire rope 200 with similar changes of length of the fibre rope 100 including an additional slack. Depending on how long the additional slack is, the fibre rope 100 may be observed hanging next to the steel wire rope 200. In one implementation of the first mode of suspension, the additional slack is sufficiently long to avoid having any weight of the load 102 being transmitted through the fibre rope 100 above the apparatus 1 but not long enough that it becomes possible for the fibre rope 100 to get inadvertently wound around or stuck into other components of the system or the load 102. In another implementation of the first mode of suspension, the added slack has a length equivalent to the perimeter of at least one turn of a drum being used on the floating vessel 10 for controlling the extended length of the fibre rope 100.

In a second mode of suspension, shown in FIG. 4B, the weight of the load 102 is transmitted to the floating vessel 10 entirely by the fibre rope 100. This mode is useful for moving the apparatus 1 along the fibre rope 100 while maintaining the length of the fibre rope 100 between the floating vessel 10 and the load 102. It can be observed in FIG. 4B that the apparatus 1 is suspended at an intermediate position between the two connectors 101 on the fiber rope 100 and can be raised or lowered as needed.

Switching the system from the first mode of suspension to the second mode of suspension can be achieved by altering the lengths of the elongated hoisting members so that the apparatus 1 no longer holds the connector 101. By "altering the lengths" is meant to spool in/out the elongated hoisting members by means of winches provided on the floating vessel 10, as will be understood by a person skilled in the art. The elongated hoisting members can be controlled to lower the apparatus 1 in relation to the fibre rope 100 and, at some moment, cause the weight of the load 102 to be transmitted to the floating vessel 10 entirely through the fibre rope 100. That moment will occur when the length of the fibre rope 101 between the floating vessel 10 and the connector 101 being held by the apparatus 1 becomes shorter than the length of the steel wire rope 200 between the floating vessel 10 and the apparatus 1. This also results in the apparatus 1 no longer holding the connector 101 and being positioned at a lower position of the fibre rope 100 than the connector 101.

Switching from the second mode of suspension to the first mode of suspension can be achieved in an opposite manner. When starting from the second mode of suspension, the apparatus 1 can be raised until it encounters a connector 101 and the latter enters the channel of the apparatus 1. By continuing to decrease the length of the steel wire rope 200, the apparatus 1 will hold the connector 101 and this will cause the weight of the load 102 to be transmitted to the floating vessel 10 in accordance with the first mode of suspension.

In order to avoid subjecting the fibre rope 100 to bending cycles under load, the system can be operated so that it only changes the extended length of the fibre rope 100 during the first mode of operation while having the steel wire rope 200 perform all the bending cycles under load. During both the second mode of suspension and switching between modes of suspension, the length of the fibre rope 100 extended from the floating vessel 10 may be kept constant and the steel wire rope 200 may be made longer or shorter to position the apparatus 1 as needed. Therefore, the fibre rope 100 is kept free from deterioration due to bending cycles under load both during the modes of suspension and the switching moments between modes of suspension. This maximizes the lifetime of the fibre rope 100. Also, the predictability of when the fibre rope 100 should be replaced will be improved because the fibre rope 100 will only be used under load when kept still. The higher predictability results in a higher safety.

By observing FIG. 4A firstly and FIG. 4B secondly, it can be seen that, after the system changed to the second mode of suspension, the apparatus 1 was raised by the steel wire rope 200 and moved past the lower connector 101 on the fiber rope 100 without holding it. This was achieved by having the apparatus 1 change to a configuration for moving past the connector 101 before being raised and moved past the connector 101. In such a configuration, the features in the apparatus 1 for holding the connector 101 are disabled.

In an opposite situation, i.e. by observing FIG. 4B firstly and FIG. 4A secondly, the apparatus 1 also requires the ability to move past the lower connector 101. It can be seen that, before the system changed to the first mode of suspension, the apparatus 1 first had to be moved past the lower connector 1 to reach a position on the fibre rope 100 below the lower connector 101 and then be raised to hold the connector 101. Thus, apparatus 1 includes features for moving past a connector 101 when the apparatus 1 is being lowered.

With the system embodiment shown in FIGS. 4A and 4B, moving the load 102 between two submerged positions separated by a distance longer than the length of the steel wire rope 200 can be achieved by continuously alternating between the first and second modes of suspension until the target submerged position is reached. During the first mode of suspension, the steel wire rope 200 is used for performing bending cycles under load in the direction of the lowering or raising operation being carried out, and during the second mode of suspension the steel wire rope 200 is used for moving the apparatus 1 in the opposite direction. In particular, when lowering the load 102 the length of the steel wire rope 200 is increased during the first mode of suspension and decreased during the second mode, whereas when raising the load 102 the length of the steel wire rope 200 is decreased during the first mode and increased in the second mode. Thus, the system can be useful for lowering, raising, or lowering and raising a load 102 between two submerged positions reachable by the fibre rope 100.

In order to lower the load 102 over a distance longer than the length of the steel wire rope 200, the following steps may be repeated:

- while performing the first mode of suspension, extending both the fibre rope 100 and the steel wire rope 200 so that the load 102 and the apparatus 1 are lowered;
- switching to the second mode of suspension so that the apparatus 1 disconnects from the connector 101 that was used in the first mode of suspension when lowering the load 102 and the apparatus 1;
- changing the apparatus 1 to a configuration for moving past the connector 101 when the apparatus 1 is raised;
- while maintaining the second mode of suspension, decreasing the steel wire rope 200 towards the floating vessel 10 so that the apparatus 1 raises towards the floating vessel 10, moves past the connector 101 and continues raising towards the floating vessel 10; and
- with the apparatus 1 no longer changed to the configuration for moving past the connector 101, switching to the first mode of suspension so that the apparatus 1 holds another connector 101 at an upper position of the fibre rope 100.

The efficiency of these steps can be improved by maximizing a threshold length of the steel wire rope 200 at which the system stops extending both the fibre rope 100 and the steel wire rope 200 and switches to the second mode of suspension. For example, with a steel wire rope 200 embodiment with a total maximum length of 300 meters, it can be useful to establish a threshold length equal to the total maximum length minus a safety margin length, such as 2 to 5 meters. The safety margin length allows the system to still have some steel wire rope 200 available to perform the step of switching to the second mode of suspension. The skilled person will find several possibilities for suitable maximum total and safety margin lengths. Maximizing the length of the steel wire rope 200 at which the system switches to the second mode of suspension also has the advantage of minimizing the aggregate time during which the second mode of suspension is performed with the fibre rope 100 kept with a constant length waiting for the apparatus 1 to be repositioned and connected to the next connector 101 at an upper position on the fibre rope 100.

In order to raise the load 102 over a distance longer than the length of the steel wire rope 200, the following steps may be repeated:

- while performing the second mode of suspension, extending the steel wire rope 200 to lower the apparatus 1 until the apparatus 1 moves past a connector 101 at a lower position on the fibre rope 100;
- switching to the first mode of suspension so that the apparatus 1 connects to the connector 101 by holding the latter;
- while maintaining the first mode of suspension, decreasing both the length of the fibre rope 100 and the length of the steel wire rope 200 so that the load 102 is raised; and
- switching to the second mode of suspension so that the apparatus 1 may be lowered to catch another connector 101 at a lower position on the fibre rope 100.

In these steps, the efficiency of raising the load 102 over a distance longer than the length of the steel wire rope 200 may also be improved. This can be achieved by maximizing a threshold length of the steel wire rope 200 at which the system switches to the first mode of suspension after having extended the length of the steel wire rope 200. For example, with a steel wire rope 200 embodiment with a total maximum length of 300 meters, it can be useful to establish the threshold length as being equal to the maximum total length of the steel wire rope 200. Maximizing the length of the steel wire rope 200 at which the system switches to the second mode of suspension also has the advantage of minimizing the aggregated time during which the second mode of suspension is performed with the fibre rope 100 kept with a constant length waiting for the apparatus 1 to be repositioned and connected to the next connector 101 at a lower position on the fibre rope 100.

The system embodiment can be provided with appropriate dimensions and parameters for the operations that will be performed. In some situations, it may be useful to provide the fibre rope 100 with a length that is sufficient to reach the seabed 20 from the floating vessel 10, while the steel wire rope 200 may be provided with a length corresponding to a portion of the distance between the floating vessel 10 and the seabed 20 so that a balance is established between the maximum total length of the steel wire rope 200 and the necessary requirements imposed on the floating vessel 10 in order to hoist the steel wire rope 200. For example, in one embodiment suitable for deep-water hoisting operations the fibre rope 100 may have a total length of at least 3000 meters and the steel wire rope 200 a length of at least 300 meters.

Generally, the terms used in this description and claims are interpreted according to their ordinary meaning the technical field, unless explicitly defined otherwise. Notwithstanding, the terms "comprises" and "comprising" and variations thereof mean that the specified features, steps or integers are included. These terms are not interpreted to exclude the presence of other features, steps or integers. Furthermore, the indefinite article "a" or "an" is interpreted openly as introducing at least one instance of an entity, unless explicitly stated otherwise. An entity introduced by an indefinite article is not excluded from being interpreted as a plurality of the entity.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the embodiments described above, many equivalent modifications and variations will be apparent to those skilled in the art when given this disclosure. Accordingly, the embodiments of the invention set forth above are considered to be illustrative and not limiting. Various changes to the described embodiments may be made without departing from the scope of the claims.

REFERENCE NUMERALS

1—apparatus
  2—channel
10—floating vessel
20—seabed
100—first elongated hoisting member
  101—connector
  102—load
200—second elongated hoisting member
300—mechanism
(310)
  311—latch
  312—pivot
  313—stopper
  314—elastic body
320—first chamber
330—hydraulic cylinder
  331—piston rod
  332—second chamber
  333—piston
  334—third chamber
  335—third control valve
340—valve module
  341—first control valve
  342—contact switch
  343—one-way valve
  344—second control valve

The invention claimed is:

1. An apparatus for suspending a connector provided on a first elongated hoisting member during a subsea hoisting operation, the apparatus comprising:

a mechanism configured to hold the connector, wherein the mechanism is configured to change to a configuration for moving past the connector while the apparatus is raised when subjected to a hydrostatic pressure above a threshold pressure.

2. The apparatus of claim 1, wherein the mechanism comprises:

a first chamber configured to contain a compressible fluid;

a hydraulic cylinder comprising a second chamber hydraulically coupled to the first chamber and a third chamber configured to contain a fluid subjected to a hydrostatic pressure, wherein the second chamber and the third chamber are separated by a piston; and a first control valve configured to control the hydraulic connection between the first chamber and the second chamber; and a contact switch configured to activate the first control valve when the connector actuates on the contact switch.

3. The apparatus of claim 2, wherein the apparatus comprises a one-way valve arranged in parallel to the first control valve, wherein the one-way valve is oriented to permit a free flow only from a hydraulic connection of the first control valve to the first chamber to another hydraulic connection of the first control valve to the second chamber.

4. The apparatus of claim 2, wherein the apparatus comprises a second control valve for controlling a hydraulic connection between the first control valve and the second chamber.

5. The apparatus of claim 2, wherein the apparatus comprises a third control valve configured to control a hydraulic connection for transmitting a hydrostatic pressure into the third chamber.

6. The apparatus of claim 1, wherein the mechanism comprises:

a latch for holding the connector;

a pivot on which the latch is rotatable; and a stopper configured to stop the rotation of the latch at a position wherein the connector is holdable by the latch.

7. The apparatus of claim 2, wherein the hydraulic cylinder is positioned such that the latch is actuatable by a piston rod connected to the piston of the hydraulic cylinder, wherein the actuation by the piston rod is configured to cause the latch to rotate to a position for moving the mechanism past the connector while the apparatus is raised.

8. The apparatus of claim 6, wherein the mechanism comprises an elastic body that biases the rotation of the latch towards the stopper.

9. The apparatus of claim 6, wherein the latch comprises a density configured to position the centre of mass of the latch in relation to the pivot so that the latch automatically rotates towards the stopper.

10. The apparatus of claim 1, wherein the apparatus comprises a channel for passing the connector through the apparatus, wherein the mechanism is positioned along the channel so that the connector is holdable within the channel.

11. The apparatus of claim 2, wherein the contact switch protrudes into the channel.

12. A system for moving a load between a floating vessel and a submerged position, the system comprising:

an apparatus of claim 1;

a first elongated hoisting member for suspending the load, wherein the first elongated hoisting member comprises at least one connector configured to be held by the apparatus; and a second elongated hoisting member for suspending the apparatus.

13. A method for lowering a load from a floating vessel to a submerged position, the method comprising:

providing the system of claim 12, in a first mode of suspension, suspending the apparatus from the floating vessel using a length of the second elongated hoisting member and the load from the apparatus using a portion of a length of the first elongated hoisting member while the mechanism holds a connector provided on the first elongated hoisting member;

while maintaining the first mode of suspension, increasing both the length of the first elongated hoisting member and the length of the second elongated hoisting member from the floating vessel until the mechanism of the apparatus is subjected to a hydrostatic pressure above a threshold pressure;

in a second mode of suspension, suspending the load from the floating vessel using the length of the first elongated hoisting member;

while maintaining the second mode of suspension, changing the mechanism to a configuration for moving past the connector while the apparatus is raised.

14. A method for raising a load from a submerged position towards a floating vessel, the method comprising:

providing the system of claim 12;

in a second mode of suspension, suspending the load from the floating vessel using a length of the first elongated hoisting member;

while maintaining the second mode of suspension, increasing a length of the second elongated hoisting member until the mechanism of the apparatus moves past a connector provided on the first elongated hoisting member;

in a first mode of suspension, suspending the apparatus from the floating vessel using a length of the second elongated hoisting member and the load from the apparatus using a portion of the length of the first elongated hoisting member while the mechanism holds the connector;

while maintaining the first mode of suspension, decreasing both the length of the first elongated hoisting member and the length of the second elongated hoisting member from the floating vessel.

* * * * *